Oct. 9, 1945. H. R. HUGHES ET AL 2,386,555
DEAD RECKONING NAVIGATION DEVICE FOR AIRCRAFT
Filed July 29, 1941 7 Sheets-Sheet 2
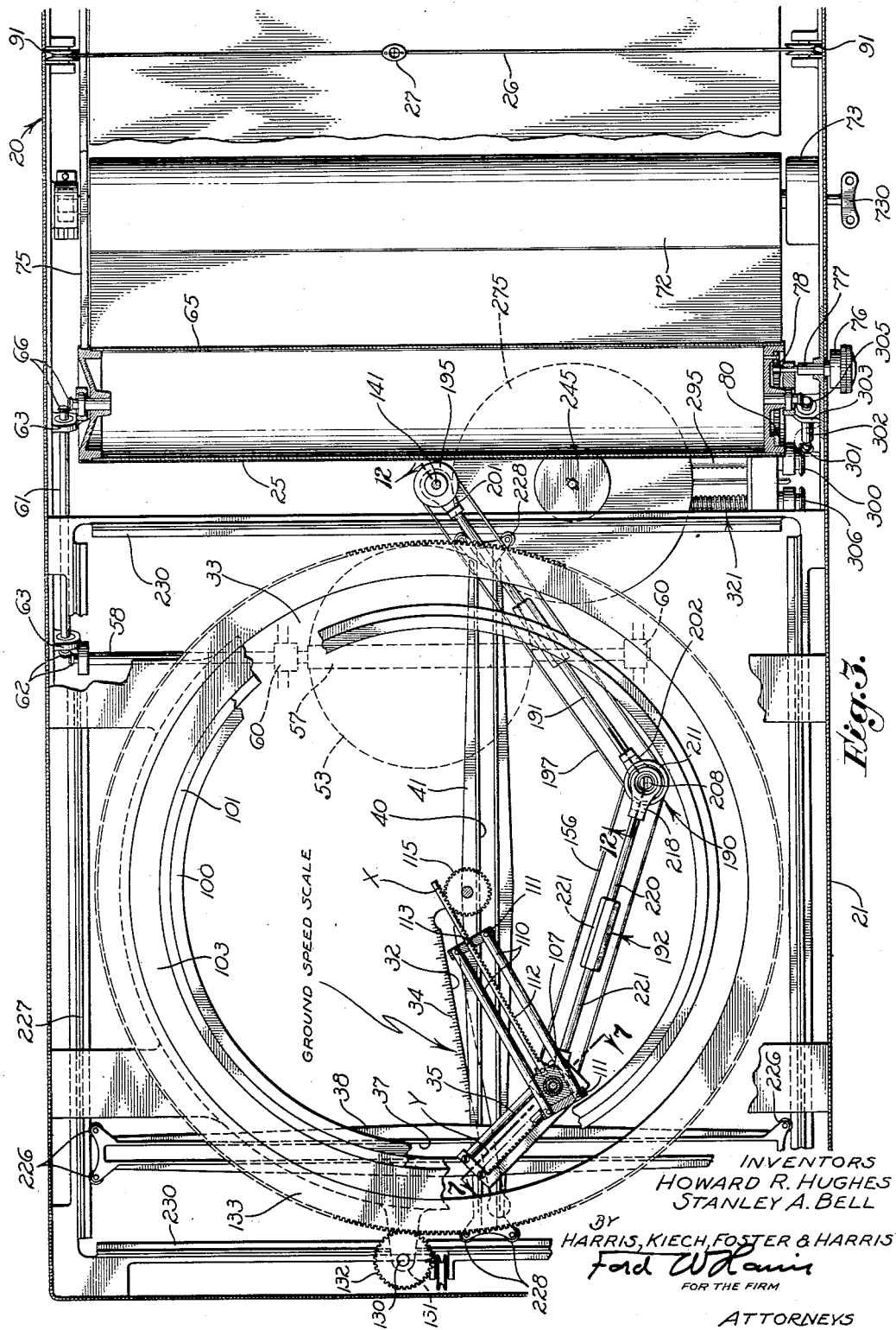
INVENTORS
HOWARD R. HUGHES
STANLEY A. BELL
BY HARRIS, KIECH, FOSTER & HARRIS
Ford W Lewis
FOR THE FIRM
ATTORNEYS

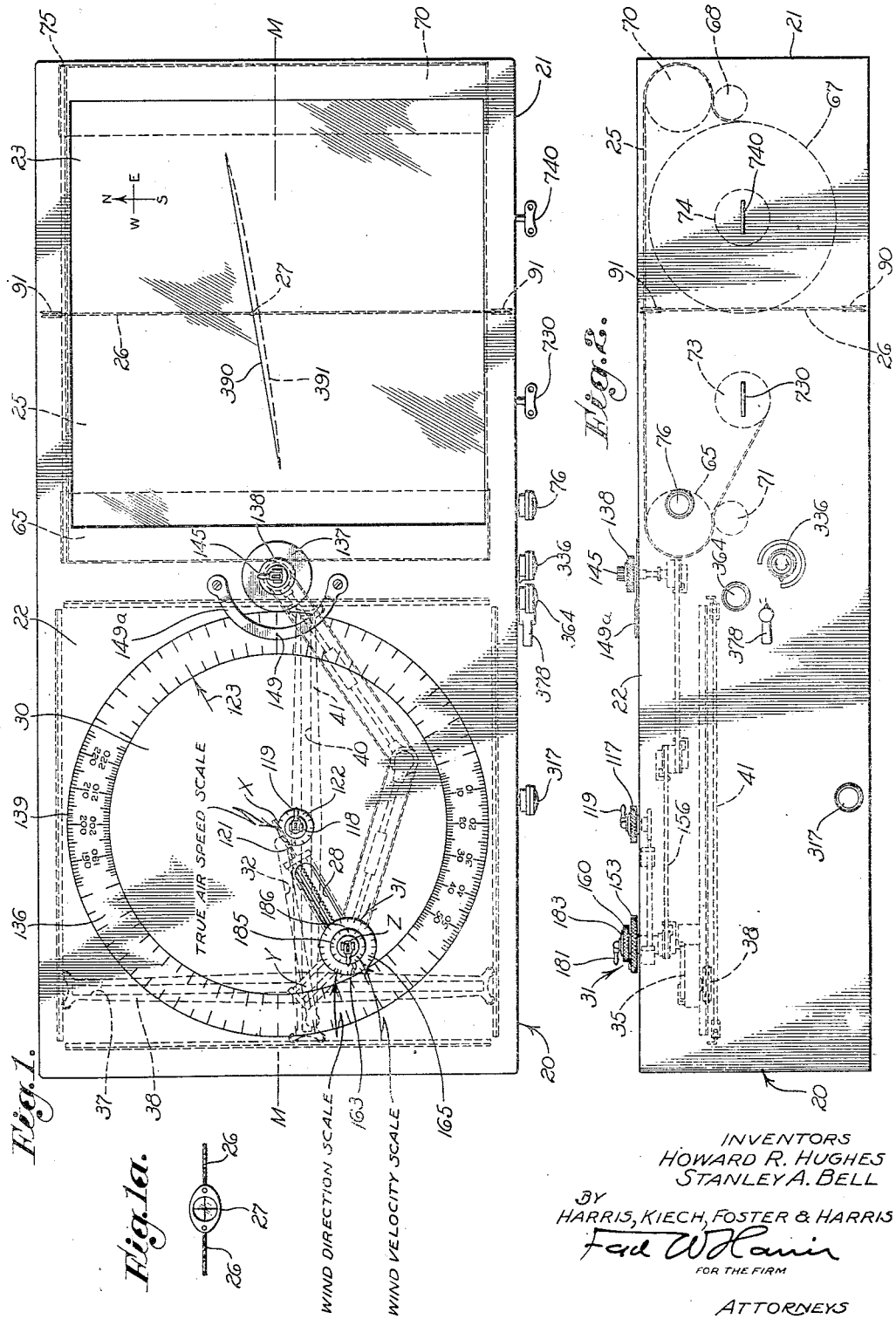

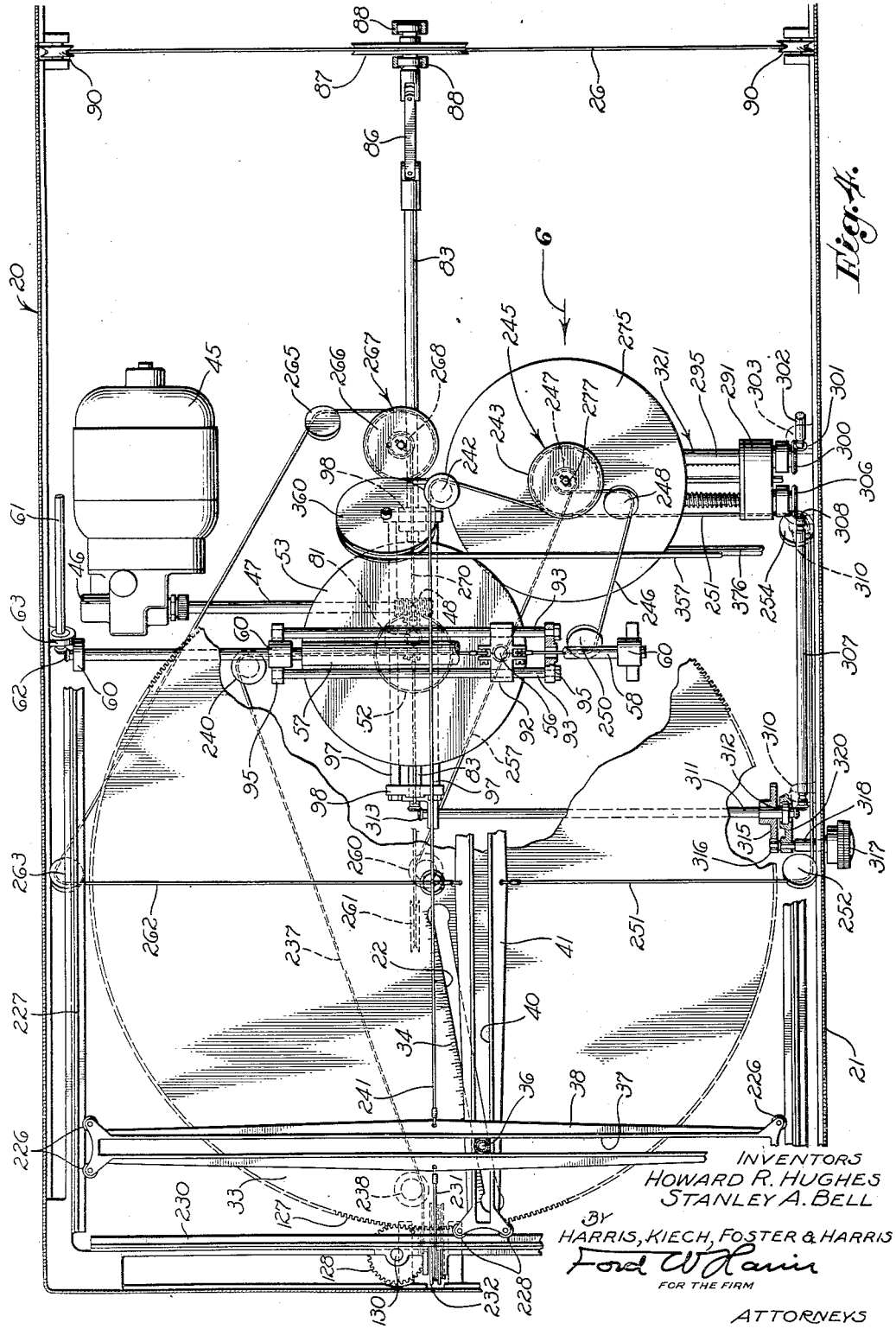

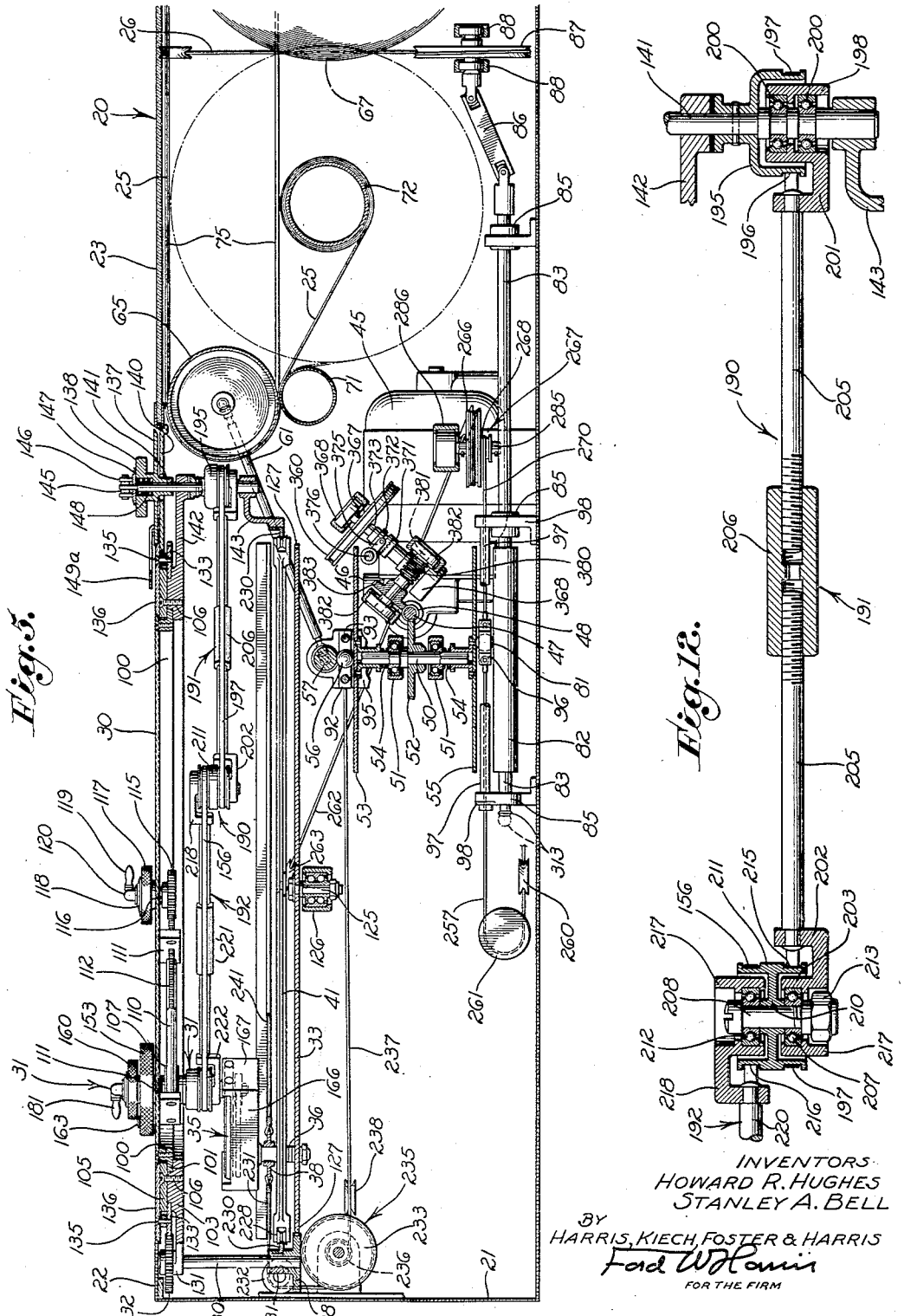

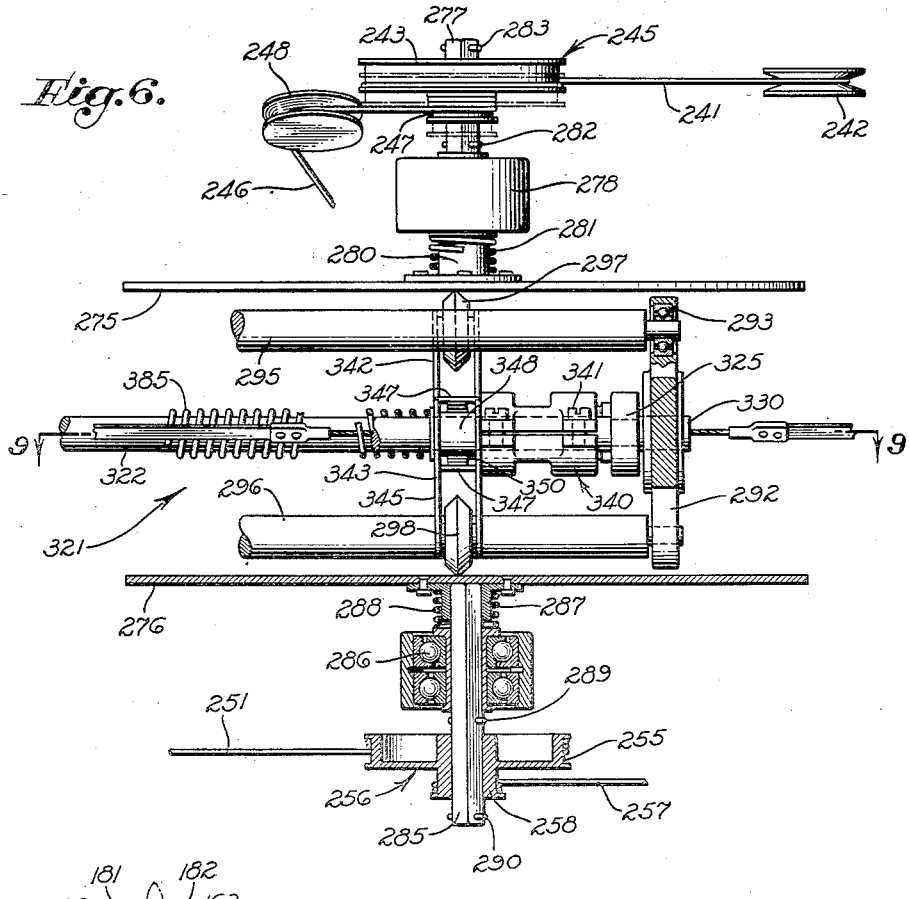
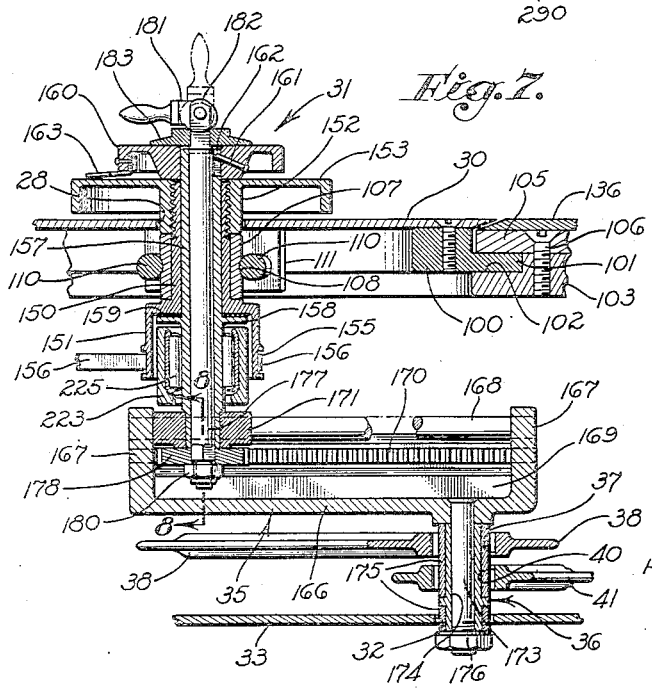
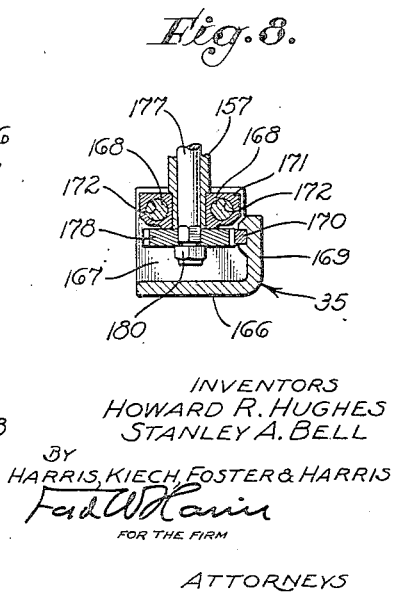
Fig. 6.
Fig. 7.
Fig. 8.
INVENTORS
HOWARD R. HUGHES
STANLEY A. BELL
BY HARRIS, KIECH, FOSTER & HARRIS
ATTORNEYS Oct. 9, 1945.   H. R. HUGHES ET AL   2,386,555
DEAD RECKONING NAVIGATION DEVICE FOR AIRCRAFT
Filed July 29, 1941   7 Sheets-Sheet 6
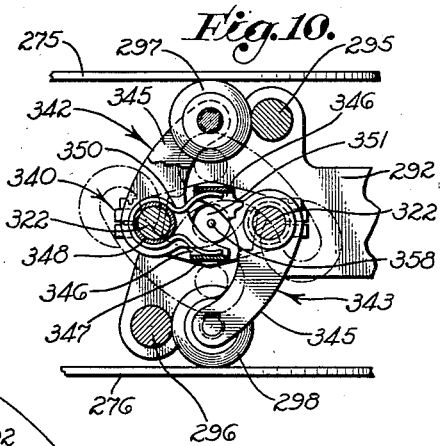
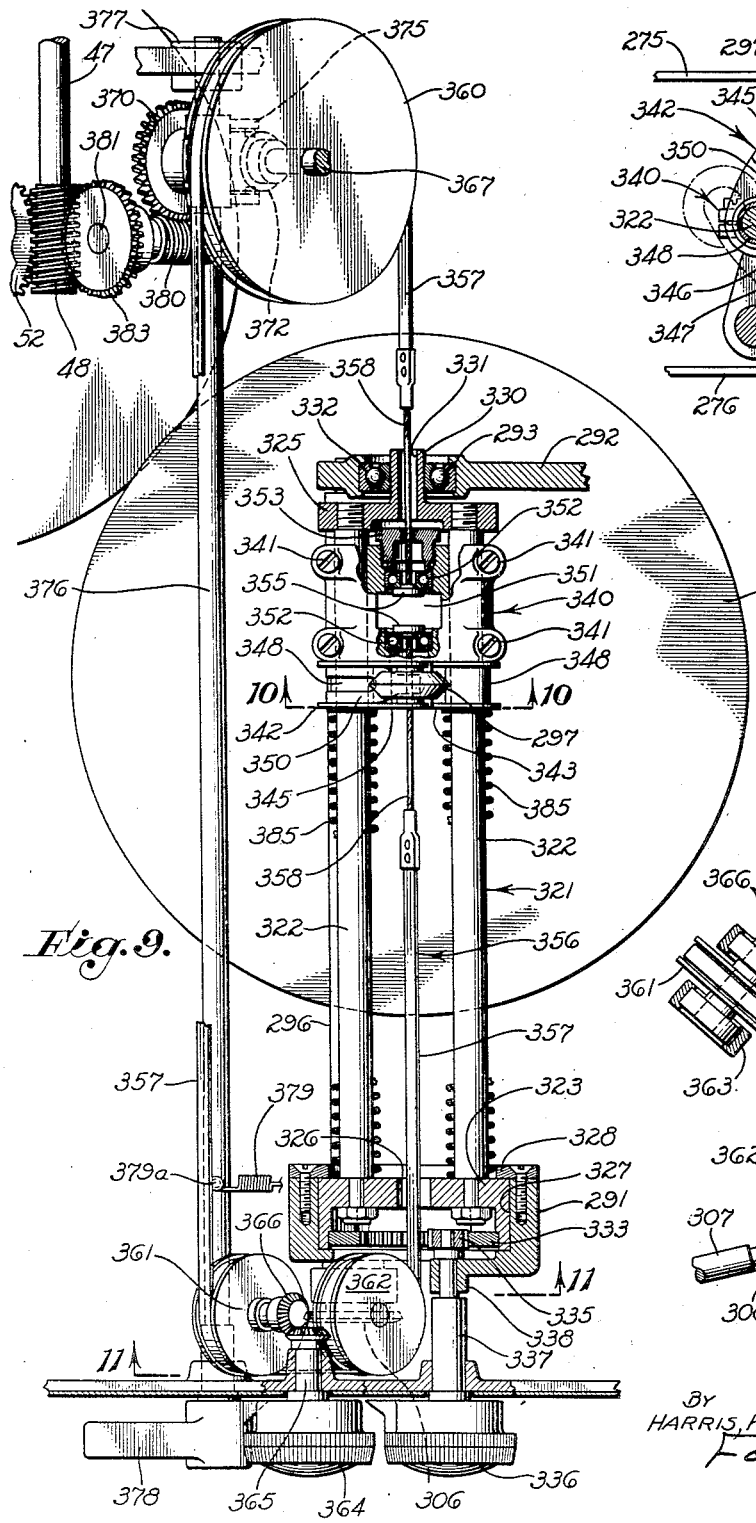
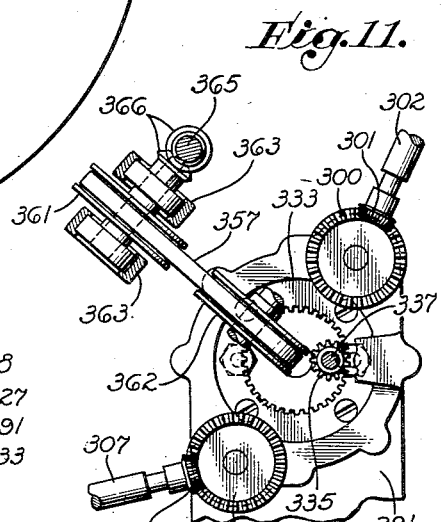
INVENTORS
HOWARD R. HUGHES
STANLEY A. BELL
BY HARRIS, KIECH, FOSTER & HARRIS
FOR THE FIRM
ATTORNEYS Patented Oct. 9, 1945

2,386,555

UNITED STATES PATENT OFFICE 2,386,555

DEAD RECKONING NAVIGATION DEVICE FOR AIRCRAFT

Howard R. Hughes, Houston, Tex., and Stanley A. Bell, Glendale, Calif., assignors to Hughes Tool Company, Houston, Tex., a corporation of Delaware Application July 29, 1941, Serial No. 404,466

21 Claims. (Cl. 73—178)

Our invention relates to navigation devices and is directed specifically to a mechanical arrangement for assisting aircraft pilots in navigation by dead reckoning.

There are two basic problems in navigation by dead reckoning, one being in essence the reverse of the other. The first of these problems is to determine from a chart or map the heading to be followed between two points in view of a given wind velocity in a given direction. The second problem, which occurs during flight, is to determine and plot on the chart the instant position of the plane on the course, the determination being based on the heading and true air speed of the plane considered with the wind. Each of these two problems involves the so-called triangle of velocities comprising a vector for wind velocity in the direction of the wind, a vector for true air speed at the head of the aircraft, and a third vector for the ground speed of the aircraft along the course.

In preparation for a flight the navigator uses given data for the course, wind direction, wind velocity, and true air speed of the craft to solve the triangle of velocities and thereby arrives at the proper heading for the required course and the ground speed along the course. During flight the navigator may observe a change in air speed or calculate a revised ground speed or be apprised of a change of wind; in any such event, he uses corrected values to revise the triangle of velocities for guidance in changing the heading of the aircraft. A further task is to determine by calculation by dead reckoning from time to time the instant position of the aircraft on the desired course. Whenever the navigator can obtain a fix by radio compass, terrain observation, or celestial observation and thereby ascertains that the aircraft is off the desired course, he may make corresponding corrections in the assumed values for wind direction and velocity to derive a new triangle of velocities and either direct the aircraft back to the original course or set a new course.

The general object of our invention is to provide a navigation aid to simplify solutions for various problems in dead reckoning, such as mentioned above, and to relieve the navigator of the usual burdens of computation. It is our purpose to provide a calculator for deriving the heading and ground speed of an aircraft for a given course under given wind conditions; to provide a calculator for indicating the instant position of an aircraft on a given course; and to provide a calculator for revising assumed wind data and values derived therefrom whenever the navigator obtains a fix during flight and evaluates a departure from a desired course.

One of the objects of our invention is to incorporate in a navigation device a mechanical triangle of velocities that may be manipulated to derive automatically desired unknown vector values. Another object is to provide a map and a marker means that are relatively movable and to control such relative movement in accord with the setting of the manipulated triangle of velocities. It is contemplated that the adjusted triangle of velocities will cause the marker to follow a predetermined course on the map at the ground speed of the aircraft and thereby cause the marker to indicate automatically the instant calculated position of the aircraft on the charted course. A further object of the invention is to provide means for automatically correcting the manipulated triangle of velocities whenever the navigator guided by a fix obtained during flight shifts the marker relative to the map to a position off the course.

Certain specific objects of the invention relate to the detailed construction of a manipulable triangle of velocities and to means for operatively relating such a mechanical triangle to the relatively movable marker and map. One of these specific objects is to provide variable transmission means for causing relative movement between the marker and map, which transmission means is responsive to adjustment of the manipulable mechanical triangle of velocities.

A further specific object is to provide a mechanical triangle of velocities that may be temporarily set with respect to certain triangle values and rendered indeterminate with respect to other values and yet permit manipulation for the purpose of arriving at the undetermined values. This latter object, for example, may be to maintain given values for such factors as heading and true air speed while the mechanical triangle is free for manipulation to derive other values based in part on the maintained values.

The above and other objects of our invention will be apparent in our detailed description to follow, taken with the accompanying drawings.

In the drawings which are to be considered as illustrative only:

Fig. 1 is a plan view of a preferred form of our invention;

Fig. 1a is an enlarged plan view of a marker body in Fig. 1;

Fig. 2 is a side elevation of the device;

Fig. 3 is a plan view of the device on a larger scale with the cover removed to reveal the interior mechanism and with certain parts omitted for the sake of clarity;

Fig. 4 is a similar plan view at a lower level with several parts omitted for the sake of clarity;

Fig. 5 is a longitudinal vertical section through the device;

Fig. 6 is an enlarged detail taken as indicated by the arrow 6 in Fig. 4, the detail being partly in section;

Fig. 7 is a fragmentary section on an enlarged scale taken by the line 7—7 of Fig. 3;

Fig. 8 is a fragmentary section taken as indicated by the line 8—8 of Fig. 7;

Fig. 9 is a horizontal section on an enlarged scale taken as indicated by the line 9—9 of Fig. 6;

Fig. 10 is a fragmentary vertical section taken as indicated by the line 10—10 of Fig. 9;

Fig. 11 is a fragmentary vertical section taken as indicated by the irregular line 11—11 of Fig. 9;

Fig. 12 is an enlarged fragmentary section taken as indicated by the angular line 12—12 of Fig. 3.

General arrangement

Figure 13:
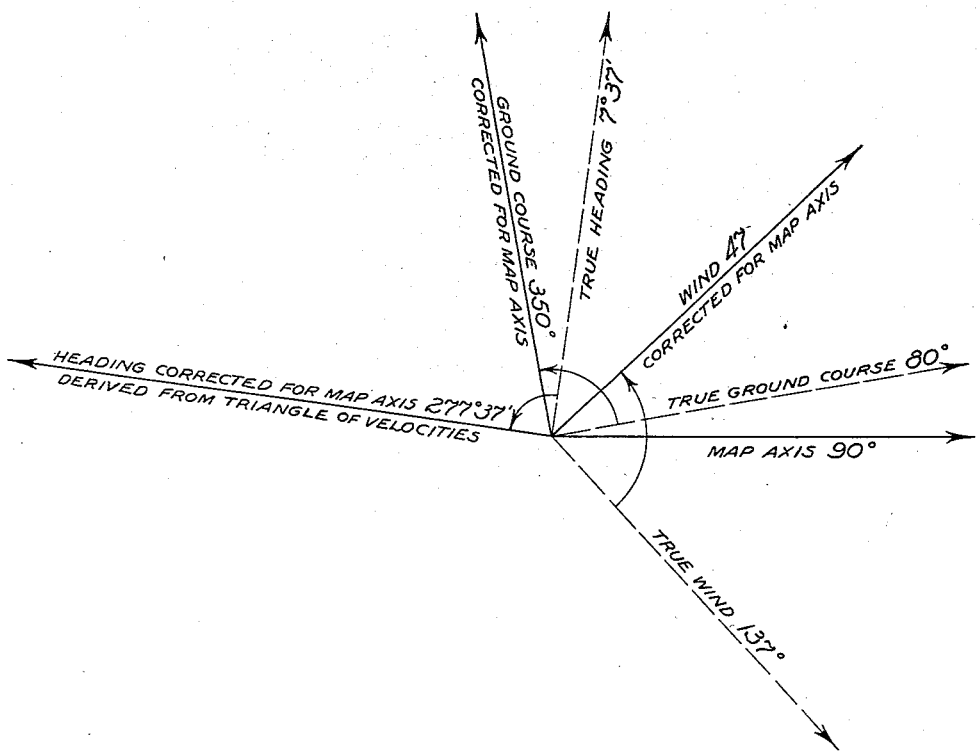
Fig. 13 is a diagram illustrating one adjustment of the triangle of velocities.

The preferred form of our invention includes a map and a marker means for designating a point on the map, the map and marker being adapted for relative movement to permit the marker to follow any desired path on the map. The required relative movement in two dimensions may be achieved with the marker stationary or with the map stationary, but we prefer to have both the map and the marker move, each according to one component of relative motion.

Figs. 1 and 2 show an instrument case generally designated 20 having fixed side and end walls 21 and a fixed top wall 22. All the walls of the instrument case may be transparent. Removably mounted in the top wall 22 is a hinged glass panel 23 covering a chart or map 25. The map 25 is adapted for movement longitudinally of the instrument case 20, and the longitudinal medial line M—M of the instrument case indicated in Fig. 1 may be termed the map axis. Disposed transversely of the map 25 is a thread or fine cable 26 carrying a marker means 27 that preferably comprises an apertured body with crosshairs such as depicted in Fig. 1a. It is apparent that movement of the map 25 in the direction of the map axis M—M may be correlated with the movement of the transverse cable 26 to cause the marker 27 to follow any desired course or path of aircraft movement on the map and that the correlated movements may be synchronized with the flight of the aircraft to designate approximately the instant position of the aircraft at all times. Suitable means to be described later are provided for independently moving the map and marker.

Whatever mechanical arrangement is employed for the contemplated triangle of velocities must be considered with reference to the map axis M—M because the triangle of velocities includes the ground speed vector, components of which are to govern the rates of map travel and marker travel. While it is not essential to orient the triangle of velocities directly with the map axis M—M, we prefer to do so and therefore place a fixed vertex of the triangle of velocities in the vertical plane of the axis M—M or in a vertical plane parallel thereto.

In Fig. 1 a fixed vertical axis X represents the fixed vertex of the triangle of velocities and the triangle is completed by a movable vertex or movable axis Y and a movable vertex or movable axis Z. The vertices X and Z define an air speed vector as one side of the triangle; the vertices Y and Z define a wind vector as a second side of the triangle; and the vertices X and Y define a ground speed vector as the third side of the triangle.

To represent the air speed vector a radial slot 28 is provided in an upper rotary table 30 best shown in Figs. 1 and 5, the table being concentric to the fixed vertex or vertical axis X, and a pivot assembly 31 representing the movable vertex or vertical axis Z is mounted for movement along the radial slot. The ground speed vector of the triangle is represented by a radial slot 32 in a lower rotary table 33 concentric to the vertical axis X and best shown in Figs. 3 and 5. Preferably a ground speed scale 34 calibrated in miles per hour is marked along the edge of the radial slot 32 and the upper rotary table 30 is made of transparent material to make the scale visible from above. The third side of the triangle of velocities, the side corresponding to the wind vector, is represented by an arm 35 shown in Fig. 5, the arm being mounted on the pivot assembly 31 to swing about the vertical axis Z. The arm 35 carries a downwardly extending pin or stud 36 in sliding engagement with the radial slot 32 in the lower rotary table, the pin representing the movable axis Y at the juncture of the ground speed vector with the wind velocity vector.

In the arrangement described above, the desired correlation of the map 25 and the marker 27 with the triangle of velocities may be achieved by any arrangement that will move the marker cable 26 at a rate proportional to the component of the ground speed vector that is perpendicular to the map axis. In other words, the rate of the map travel along the axis M—M should be governed by the spacing between the fixed vertex X and a transverse plane through the vertex Y and the rate of transverse travel of the marker 27 should be governed by the spacing of the fixed vertex X from a longitudinal plane through the movable vertex Y. The stud 36 representing the movable vertex Y slidingly extends through a slot 37 in a transverse bar 38 (Fig. 3) and likewise extends through a slot 40 in a longitudinal bar 41, and the means for transmitting motion to the map 25 is responsive to the position of the first bar relative to the fixed vertex X and the means for transmitting motion to the marker 27 is responsive to the position of the second bar relative to the fixed vertex X. The stud 36 may be termed a control member.

In addition to the above broadly described arrangement, the preferred form of our invention includes means for automatically revising the triangle of velocities in response to adjustment of the map 25 and the marker 27 whenever the marker is shifted relative to the map to a corrected position off a given map course. In this aspect of the invention it is to be noted that if the length of the true air speed vector, the direction of the true air speed vector, and the direction of the ground speed vector are held constant while the structure forming the triangle of velocities is loosened to permit the other values to be indeterminate, the vertex Y represented by the stud 36 may be shifted relative to the fixed vertex X to cause correction in length and disposition of the wind vector. In making such a correction, one further factor should be known or assumed. The further factor may be ground speed, or wind direction or wind velocity. The invention provides for such a correction procedure in which certain elements of the mechanical triangle are temporarily loosened and the two bars 38 and 41 correct the disposition of the stud 36 in response to corrective manipulation of the map and corrective manipulation of the marker.

It will be apparent that the responsiveness of the two bars 38 and 41 to corrective manipulations of the map and marker should decrease with the distance traversed in flight, since, for example, a departure of five miles from a desired course after four hours of flight represents a smaller error in the original adjustment of the triangle of velocities than a similar departure after only one hour of flight, but both departures are corrected by the same magnitude of relative movement between the marker and the map.

At the start of a flight the navigator sets the marker at the starting point of the desired course and adjusts the mechanical triangle of velocities in accord with the known data of normal true air speed of the aircraft, wind direction, wind velocity, and the direction of the course. Without any necessity for computation on the part of the navigator, the adjustment of the triangle of velocities automatically fixes the rate of movement of the map and the rate of movement of the marker to follow the desired course and automatically determines the proper heading of the aircraft to keep on the course under the predetermined or preassumed wind conditions. During flight the navigator corrects the air speed setting as often as necessary and seeks opportunities to obtain a fix. Whenever a check on the position of the aircraft leads to an adjustment of the marker relative to the map, such adjustment may be caused to react in a corrective manner on the setting of the triangle of velocities and a correction factor based on the traversed mileage is automatically introduced. A more detailed description of the preferred form of the invention follows.

*The arrangement for causing relative movement between the map and the marker*

The prime mover of the device is a motor 45 (Figs. 4 and 5) having a speed reduction mechanism 46 from which extends a drive shaft 47 carrying a worm 48. As best shown in Fig. 5 a vertical shaft 50 journaled in bearings 51 is driven by a worm gear 52 in mesh with the worm 48. The vertical shaft 50 slidingly carries on its squared upper end a horizontal map-driving disc 53 urged upward by a helical spring 54 and carries on its lower squared end a similar marker-driving disc 55 urged downward by a second helical spring 54. The map-driving disc 53 acting through a universally rotatable ball 56 drives a horizontal roller 57 that is carried by a shaft 58 (Fig. 4) journaled in two spaced bearings 60. As best shown in Fig. 3 the shaft 58 drives an inclined shaft 61 through a pair of bevel gears 62, and the shaft 61 which is journaled in bearings 63 in turn drives a map roller 65 through a pair of bevel gears 66.

The map 25 unwinds from a feed spool 67 (Fig. 2), passes over an idler roll 68 and then around a guide roller 70 from which it makes a horizontal traverse to the previously mentioned driven roller 65. From the driven roller 65 the map passes over an idler roller 71 and is taken up by a winding spool 72. As indicated in Fig. 3, the winding spool 72 may be operatively connected to a small spring motor 73 having a winding key 730, the purpose of the spring motor being to cause the winding spool to wind up the map as fast as the map is fed by the driven roller 65. In like manner the feed spool 67 may have a spring motor 74 (Fig. 2) with a winding key 740, the spring motor 74 being opposed to but weaker than the spring motor 73 and serving to rewind the map whenever the map is fed back to the spool 67 by reverse motion. It is contemplated that the normal tendency of the map to wind onto the spool 72 will materially lighten the operating load on the universally rotatable ball 56, but will not be sufficient to cause creepage of the map. Preferably the guide roller 70 is operatively connected with the driven roller 65 by a belt 75 (Figs. 3 and 5). It is obvious that various other arrangements may be employed to actuate spools 67 and 72 for winding and unwinding the map. To permit manual adjustment of the map 25 along the map axis M—M a rotatable adjustment knob 76 (Fig. 3) on the side of the instrument case is keyed to a small shaft 77 carrying a small pinion 78, the pinion meshing with a ring gear 80 unitary with the end of the driven roller 65.

As best shown in Fig. 5 the marker-driving disc 55 acting through a universally rotatable ball 81 drives a horizontal roller 82 on a shaft 83. The shaft 83, which is journaled in suitable bearings 85, is connected by a coupler 86 with a driving pulley 87 journaled in bearings 88. The previously mentioned thread or fine cable 26 carrying the marker 27 is looped around the driving pulley 87 and is guided by two lower pulleys 90 (Fig. 4) at opposite sides of the box and two upper pulleys 91 (Fig. 1) on opposite sides of the map 25.

In operation the motor 45 causes the map 25 to move at a rate governed by the spacing of the upper ball 56 from the center of the upper disc 53 and likewise causes the marker 27 to be shifted across the traveling map at a rate governed by the position of the lower ball 81 relative to the axis of the lower disc 55. For controlling the two component rates of relative movement between the map and the marker, it is merely necessary to provide means for controlling the radial dispositions of the two balls 56 and 81. For example, the upper ball 56 for controlling map movement may be rotatably confined by a cage 92 (Figs. 4 and 5) that is slidingly mounted on a pair of parallel rods 93, the rods being supported by a pair of brackets 95. In like manner the lower ball 81 may be rotatably confined by a cage 96 that slides along a pair of rods 97 extending between two brackets 98.

*The mechanical triangle of velocities*

The previously mentioned upper rotary table 30 that has the radial slot 28 representing the air speed vector of the triangle is carried by a ring 100 (Fig. 5) having a circumferential flange 101, and the circumferential flange is rotatably seated in a complementary circular groove 102 best shown in Fig. 7. The circular groove 102 is formed by a fixed circular frame 103 and a keeper ring 105 that is removably attached to the frame by suitable screws 106.

The previously mentioned pivot assembly 31 that is movable along the radial slot 28 to represent the magnitude of the true air speed vector includes a supporting block 107 just under the upper rotary table 30. As best shown in Figs. 5 and 7 the supporting block 107 is formed with horizontal side grooves 108 by means of which it is slidingly mounted on a pair of parallel support rods 110, the support rods being carried by spaced brackets 111 on the under side of the rotary table 30. As indicated in Fig. 3 the disposition of the support block 107 along the two support rods 110 is controlled by a small rack 112 that extends through a guide aperture 113 in one of the brackets 111 and is engaged by a control gear 115. The control gear 115 is mounted on the lower end of a short pin 116 that extends through the rotary table 30 and is journaled in a circular body 117 that is fixedly attached to the rotary table. The upper end of the pin 116 slidingly extends through a clamping disc 118 and hingedly carries at its upper end an eccentric lock 119, the eccentric lock being journaled in a pair of ears 120 that are integral with the clamping disc 118. When the eccentric lock is turned to horizontal disposition, as shown in Fig. 5, it presses downward against the clamping disc 118 to cause frictional engagement between the clamping disc and the circular body 117 for the purpose of immobilizing the control gear 115.

Any suitable index means may be provided to indicate the adjustment of the true air speed side of the velocity triangle in miles per hour. Since the clamping disc 118 rotates with the pin 116, a small pointer 121 (Fig. 1) may be provided on the periphery of the clamping disc to swing around a circular scale 122 marked on the upper surface of the circular body 117. The angular disposition of the pointer 121 with reference to the scale 122 represents the true air speed of the aircraft, and suitable means, such as a reference or index mark 123 (Fig. 1) on the face of the rotary table 30, indicates the heading of the aircraft or the direction in which the air speed is made.

The previously mentioned lower rotary table 33 is supported by a pivot pin 125 (Fig. 5) journaled in a suitable bearing 126 and is formed with peripheral gear teeth 127. The peripheral gear teeth 127 mesh with a gear 128 on the lower end of a vertical shaft 130 that is journaled in a pair of spaced bearings 131. A second gear 132 keyed to the upper end of the shaft 130 meshes with an external ring gear 133 that is rotatably mounted on the circular frame 103 and retained thereon by the previously mentioned keeper ring 105. Connected with the ring gear 133 by suitable screws 135 is an azimuth ring 136 that slidingly rests upon the keeper ring 105. The azimuth ring 136 surrounds the upper rotary table 30 and is controlled by a friction disc 137 integral with an adjustment knob 138. Outer and inner azimuth scales 139 are marked on the face of the ring 136. The adjustment knob 138, which overlies a stationary friction plate 140, is rotatably mounted on a pin 141, the pin being in turn rotatably carried by two spaced arms 142 and 143. As indicated in Fig. 5, the rotatable friction disc 137 has a beveled peripheral edge that overlies the similarly beveled peripheral edge of the azimuth ring 136, so that the azimuth disc may be rotated through frictional engagement by properly manipulating and rotating the adjustment knob 138. The adjustment of the azimuth ring is made while an eccentric latch 145 on the upper end of the pin 141 is in vertical disposition, and after a desired azimuth is accomplished the azimuth ring is locked by throwing the eccentric lock 145 to the horizontal disposition shown in Figs. 1 and 5. As indicated in Fig. 5, the eccentric lock 145 extends rotatably through the upper end of the pin 141 and is journaled in a pair of ears 146 integral with a clamping disc 147. A concealed pressure spring 148 is confined by the clamping disc within the adjustment knob 138. The eccentric lock creates pressure to immobilize the pin 141 as well as the friction disc 137.

For guidance in the rotary adjustment of the azimuth ring 136 a suitable lubber line may be provided for reference relative to the azimuth scale 139. In our preferred arrangement an index mark 149 is provided on a U-shaped sheet metal member 149a overhanging the azimuth ring, the index mark representing the direction of the map axis M—M. The azimuth scale and the index mark comprise orientation means for the triangle of velocities.

Fig. 7 shows in detail the construction of the pivot assembly 31 that carries the arm 35 representing the wind vector in the triangle of velocities. A sleeve 150 that is expanded at its lower end to form a drum 151 is journaled in the previously mentioned supporting block 107 and is threaded into a hub 152 for support. The hub 152 which rests on the supporting block 107 is integral with a flanged scale disc 153. The purpose of the drum 151 is to cooperate with locking means hereinafter described for the purpose of maintaining any given orientation of the scale disc 153 during orbital movement of the pivot assembly 31 about the vertical axis X of the rotary table 30. Fig. 7 shows the drum 151 formed with a peripheral groove 155 that is frictionally engaged by a locking tape 156.

Rotatably mounted within the sleeve 150 is a vertical tube 157 having a radial flange 158 inside the drum 151, the radial flange carrying a washer 159 of suitable material for friction contact with the horizontal inner surface of the drum. The tube 157 slidingly extends at its upper end into a wind-direction disc or knob 160. The wind-direction disc 160 is keyed to the tube 157 by a suitable pin 161 extending into a slot 162 and carries a radial extending pointer 163 that traverses an azimuth scale 165 on the upper face of the non-rotatable scale disc 153.

The wind-vector arm 35 includes an elongated body 166 having upwardly extending end walls 167, the two end walls being interconnected by a parallel pair of polished rods 168 and by a longitudinal wall 169 carrying a rack member 170. The tube 157 that supports the arm 35 is attached directly to a block 171 that has horizontal bores 172 (Fig. 8) slidingly embracing the two rods 168. The previously mentioned stud 36 defining the movable vertex Y of the triangle comprises a pin 173 extending downwardly from the elongated body 166, the pin being surrounded by an inner sleeve 174 and two outer sleeves 175 that are retained thereon by a suitable nut 176. One outer sleeve 175 extends through the planes of the transverse bar 38 and the longitudinal bar 41, and the other sleeve 175 extends through the plane of the lower rotary table 33. It is apparent that the effective length of the arm 35, i. e., the dimension corresponding to the wind vector is determined by the distance between the axis of the stud 36 and the axis of the pivot assembly 31, and that this distance may be varied by sliding the polished rods 168 axially in the block 171.

For the purpose of controlling the effective length of the arm 35 a vertical shaft 177 is rotatably and slidably mounted within the tube 157, and the lower end of the shaft is squared to receive a pinion 178 that is retained thereon by a suitable means such as a nut 180. The upper end of the shaft 177 is pivotally connected to an eccentric lock 181 that is journaled in a pair of ears 182 extending upwardly from a clamping disc 183. When the eccentric lock 181 is in the ineffective vertical disposition indicated by dotted lines in Fig. 7, the tube 157 and the vertical shaft 177 are independently rotatable to permit independent adjustment of the disposition and effective length of the arm 35. Downward movement of the eccentric lock 181 from the vertical position to the effective horizontal position shown in full lines in Fig. 7 places the vertical shaft 177 under tension to lock the pivot assembly against any change in either disposition or length of the arm 35. When the pivot assembly is locked, the shaft 177 is immobilized both by frictional engagement of the pinion 178 with the block 171 and by engagement pressure exerted by the clamping disc 183 on the fixed scale disc 153 through the wind-direction disc 160. The tube 157 that determines the disposition of the arm 35 is immobilized by the gripping of the wind-direction disc 160 between the clamping ring and the scale disc 153. To provide a visible index at the top of the device for the effective length of the arm 35, a circular wind velocity scale 185 is marked on the upper surface of the wind direction disc 160 to be read with reference to a pointer 186 that is mounted on or is integral with the clamping disc 183 and that rotates with the vertical shaft 177.

The previously mentioned locking means for maintaining a given orientation of the scale disc 153 in the pivot assembly 31 may comprise a flexible or articulated orientation lock generally designated 190 (Figs. 3, 5, and 12) that embodies a principle heretofore applied to drafting instruments for the purpose of maintaining a given alignment of a movable straight edge. Such an articulated lock includes an arm 191 that is mounted to swing about a fixed pivot in combination with a second arm or link 192 that interconnects the first arm with the pivot assembly 31.

As best shown in Figs. 3 and 12, a drum 195 is keyed on the previously mentioned pin 141 and is formed with a peripheral groove 196 for frictional engagement with a continuous locking metal tape 197. Within and below the drum 195 a cylindrical body 198 is revolvably mounted on the pin 141 by a pair of suitable bearings 200. The cylindrical body 198 has a lateral extension 201 that forms a part of the arm 191 of the lock, and the other parts of the arm include a lateral extension 202 from a second cylindrical body 203 and two sections of rod 205 that interconnect the lateral extensions 201 and 202. The two sections of rod 205 are coupled together by a turnbuckle sleeve 206. The second cylindrical body 203 embraces a bearing 207 in which is mounted a floating pivot pin 208. The floating pivot pin is rotatably embraced by a hub portion 210 of what may be termed a double drum 211 and is likewise embraced by an upper bearing 212, the double drum and two bearings being retained on the pin by a suitable means such as a nut 213.

The double drum 211 is formed with two spaced peripheral grooves, a lower groove 215 that is engaged by the locking tape 197 from the drum 195 and an upper groove 216 engaged by the previously mentioned locking tape 156 from the drum 151 on the pivot assembly 31. The upper bearing 212 above the double drum 211 rotatably carries a cylindrical body 217 having a lateral extension 218 that is part of the previously mentioned link 192. In addition to the lateral extension 218 the link 192 comprises two sections of rod 220, a turnbuckle sleeve 221 coupling the two sections of rod, and a lateral extension 222 (Fig. 5) from a cylindrical body 223 that is rotatably connected to the pivot assembly 31. Fig. 7 shows the cylindrical body 223 provided with a roller bearing 225 surrounding the tube 157 of the pivot assembly.

The two turnbuckle sleeves 206 and 221 are normally adjusted to place the locking tapes 156 and 197 under sufficient tension to prevent any slippage of the tapes relative to the associated drums 151, 195, and 211. Swinging movement of the first arm 191 of the articulated lock about the axis of the pin 141 translates the double drum 211 through space, and the locking tape 197 rotatably interlocks the double drum with the drum 195. If the drum 195 is immobilized by the eccentric lock 145 on the pin 141, the tape 197 prevents rotation of the double drum during such translation through space. Since the double drum 211 is in turn interlocked with the drum 151 of the pivot assembly through the medium of the locking tape 156, the double drum in turn prevents rotation of the drum 151 and thereby prevents rotation of the scale disc 153 regardless of bodily movement of the pivot assembly about the fixed vertex X.

In the described arrangement the articulated lock 190 is employed to maintain given directions of the wind vector. It will be apparent that the vector thus controlled may represent any of the three velocity vectors, for example, the ground speed vector.

*Means for responsively connecting the marker and map with the triangle of velocities*

As previously stated, the stud 36 that represents the movable vertex Y of the triangle extends downwardly through the slot 37 of the transverse bar 38 and the slot 40 of the longitudinal bar 41. The transverse bar 38 has a pair of small grooved wheels 226 at each of its ends (Fig. 4) that engage corresponding longitudinal rails 227 to support the bar. In the same manner the longitudinal bar 41 has a pair of grooved wheels 228 at each of its ends in supporting engagement with transverse rails 230. To make the rates of movement of the map and marker responsive to the triangle of velocities, it is necessary merely to operatively connect the transverse bar 38 with the ball cage 92 associated with the map-driving disc 53 and to operatively connect the longitudinal bar 41 with the ball cage 96 associated with the lower marker-driving disc 55.

As best shown in Figs. 4 and 5, a cable 231 connected with the transverse bar 38 passes over a pulley 232 and is terminally connected to the large diameter portion 233 of a differential drum 235. From the small diameter portion 236 of the differential drum 235 a cable 237 passes around guide pulleys 238 and 240 to connect to one side of the ball cage 92. From the opposite side of the transverse bar 38 a cable 241 passes around a guide pulley 242 for terminal connection to a large diameter portion 243 of a differential drum 245, and a cable 246 from the small diameter portion 247 of the differential drum passes around two guide pulleys 248 and 250 to connect with the opposite end of the ball cage 92. The purpose of the two differential drums 235 and 245 is to compensate for the fact that the cage 92 has a smaller range of movement than the transverse bar 38. Except for the differential relationship, the four cables 231, 237, 241, and 246 act, in effect, as one continuous cable and the arrangement is such that the spacing of the ball cage 92 from the axis of the map-driving disc 53 is in proportion at all times with the spacing of the transverse bar 38 from the fixed vertex X of the triangle of velocities.

The longitudinal bar 41 is operatively connected with the lower ball cage 96 in a similar manner as indicated in Figs. 4 and 5. A cable 251 from one side of the longitudinal bar 41 passes around two guide pulleys 252 and 254 and is terminally wound on the large diameter portion 255 of a differential drum 256. A cable 257 from the small diameter portion 258 of the differential drum 256 is led around a horizontal guide pulley 260 and a vertical guide pulley 261 to one end of the ball cage 96. A cable 262 extends around guide pulleys 263 and 265 to terminate on the large diameter portion 266 of a differential drum 267. From the small diameter portion 268 of the differential drum 267 a cable 270 extends directly to the second end of the ball cage 96. The arrangement is so adjusted that the cage 96 at all adjustments of the velocity triangle is spaced from the axis of the marker-driving disc 55 proportionately with the spacing of the longitudinal bar 41 from the fixed vertex X of the triangle.

*The means for correcting the triangle of velocities in response to relative movement between the marker and the map*

As indicated in Fig. 6, an upper map-correction disc 275 is operatively connected to the previously mentioned differential drum 245 to cause movement of the transverse bar 38 and a lower marker-correction disc 276 is operatively connected to the previously mentioned differential drum 256 to cause movement of the longitudinal bar 41.

In the particular construction shown in Fig. 6, the differential drum 245 is slidingly, but nonrotatably, mounted on a square shaft 277 that is slidingly and rotatably supported in a suitable bearing 278, and the map-correction disc 275 is mounted on the end of the square shaft by a hub member 280. A suitable helical spring 281 surrounding the hub member 280 acts between the bearing 278 and the disc 275 to continuously urge the disc axially downward. A transverse stop pin 282 in the square shaft 277 above the bearing 278 limits the downward movement of the correction disc and cooperates with a second stop pin 283 to confine the differential drum 245 on the shaft. The pins 282 and 283 are spaced to provide a degree of axial freedom for the differential drum 245 and thereby permit the differential drum to seek the planes of cooperating pulleys associated with cables on the differential drum. In similar manner the differential drum 256 is mounted on a square shaft 285 that extends upward through a bearing 286 to a hub member 287 that supports the marker-correction disc 276. A helical spring 288 urges the square shaft 285 and the marker-correction disc 276 upward to an extent limited by a stop pin 289 and a second stop pin 290 is provided to retain the differential drum 256 on the shaft.

Between the planes defined by the two correction discs 275 and 276 are two brackets or supporting arms, a first bracket 291, different views of which are shown in Figs. 4, 9, and 11, and a second bracket 292 shown in Figs. 6, 9, and 10. Mounted in suitable bearings 293 in the two brackets is an upper horizontal roller 295 for driving the correction disc 275 and a lower horizontal roller 296 for driving the lower correction disc 276. The means for operatively connecting the two rollers with the corresponding correction discs may comprise an upper friction wheel 297 associated with the upper roller and upper disc and a lower friction wheel 298 associated with the lower roller and lower disc, the two wheels being made of suitable material, such as fiber or rubber, and preferably having tapered configurations as shown.

The upper horizontal roller 295 associated with the map-correction disc 275 is operatively connected to a bevel gear 300 on the bracket 291, which bevel gear is in mesh with a second bevel gear 301 to drive an inclined shaft 302. The inclined shaft 302, which is journaled in suitable bearings 303, is operatively connected to the map-driving roller 65 through a pair of bevel gears 305. It is apparent that when the disposition of the map 25 is corrected by manual rotation of the knob 76 corresponding movement may be transmitted to the upper friction wheel 297 through the upper horizontal roller 295, and the amount of rotation transmitted by the friction wheel to the map-correction disc 275 will depend upon the position of the friction wheel relative to the axis of the map-correction disc.

The lower horizontal roller 296 is operatively connected to a bevel gear 306 on the bracket 291, the bevel gear 306 driving an inclined shaft 307 (Fig. 4) through a small bevel gear 308. The inclined shaft 307 is mounted in a pair of bearings 310 and drives a transverse shaft 311 through a pair of bevel gears 312. As indicated in Figs. 4 and 5 the transverse shaft 311 is connected by a pair of bevel gears 313 to the previously mentioned roller 82 that is associated with the marker-driving disc 55. The transverse shaft 311 carries a gear 315 in mesh with a small pinion 316 controlled by a marker-adjustment knob 317, the knob and pinion being interconnected by a shaft 318 journaled in a bracket 320. Rotation of the knob 317 for correction of the marker 27 relative to the map 25 transmits corresponding motion to the lower friction wheel 298 through the lower horizontal roller 296 and the resultant rotation of the marker-correction disc 276 will vary with the disposition of the friction wheel relative to the center of the disc.

Since the two friction wheels 297 and 298 cause minimum rotation of the corresponding correction discs 275 and 276 when at maximum distance from the centers of the two discs, and since the error in an adjustment of the triangle of velocities represented by a given magnitude of map or marker adjustment decreases with elapsed time of flight, or, more strictly speaking, with the mileage traversed since the setting of the triangle of velocities, it is apparent that the two friction wheels 297 and 298 should progressively shift outward from the common axis of the two correction discs 275 and 276 as the aircraft moves progressively away from a location on the course at which the triangle of velocities is originally set. In our preferred construction we mount the two friction wheels 297 and 298 on what may be termed a correction assembly generally designated 321 that is movable between a normal ineffective disposition and an effective disposition. One purpose of the correction assembly is to provide for normal ineffective positions of the two friction wheels whereby the friction wheels may be out of contact with the two correction discs while the friction wheels are being progressively shifted in the course of flight. A suggested construction for such a correction assembly will now be described.

The correction assembly 321 includes a rotary frame comprising two parallel rods 322 interconnected by rotary heads 323 and 325 that are journaled respectively in the two brackets 291 and 292. As best shown in Fig. 9, the rotary head 323 is a circular body with an axial aperture 326 and is rotatably secured in a circular seat 327 in the bracket 291 by a removable keeper ring 328. The other rotary head 325 may be a body formed with a trunnion extension 330 having an axial aperture 331, the trunnion extension being journaled in a suitable bearing 332 in the bracket 292. To control the disposition of the described rotary frame about its axis of rotation, the rotary head 323 is provided with an internal ring gear 333 in mesh with a small pinion 335, and a manually operable knob 336 on the side of the instrument case is operatively connected with the small pinion by a shaft 337 journaled in a fixed bearing 338.

Mounted on the parallel rods 322 of the rotary frame is a slidable carriage 340 which, for ease of assembly, may be made in two separable parts united by suitable screws 341. Adjacent the carriage 340 and likewise slidingly mounted on the two rods 322 is a pair of bell-cranks, an upwardly extending bell-crank 342 carrying the upper friction wheel 297 and a downwardly extending bell-crank 343 carrying the lower friction wheel 298.

As indicated in Figs. 6 and 9 each of the bell-cranks 342 and 343 may consist of a suitably shaped piece of sheet metal bent to form a pair of long arms 345 carrying the corresponding friction wheel and a pair of short arms 346 interconnected by a web 347. A sheet metal spacing sleeve 348 is included in the construction of each of the bell-cranks and one of these spacing sleeves is embraced by a spring clip 350 that presses outwardly against each of the webs 347. The effect of the spring pressure is to urge each of the bell-cranks clockwise as viewed in Fig. 10.

When the correction assembly 321 is in the effective disposition indicated by full lines in Fig. 10, the spring 350 causes the two friction wheels 297 and 298 to be pressed into effective contact with the corresponding horizontal rollers 295 and 296. When the correction assembly 321 is rotated counter-clockwise, each of the bell cranks is moved by the spring clip 350 to a limit position abutting the web 347 or short arm 346 of the other bell-crank, the position of the friction wheels at such time being indicated in dotted lines in Fig. 10. It is apparent from an inspection of Fig 10 that the pressure toward the correction assembly 321 exerted by the yieldingly mounted correction discs 275 and 276 serves three purposes: first, to establish effective frictional contact between the correction disc and the associated friction wheel; second, to increase the pressure of the friction wheel against the associated horizontal roller; and, third, to yieldingly maintain the correction assembly in the effective disposition shown in Fig. 10. It will be noted that initial rotation of the correction assembly out of the effective disposition necessitates slightly spreading the two correction discs apart in opposition to the springs 281 and 288 on the hubs of the discs.

The slidable carriage 340 has a longitudinal passage 351 in which two ball-bearings 352 are retained by corresponding bushings 353. Rotatably carried by the two ball-bearings 352 are two anchor bodies 355 to which are attached the opposite ends of a flexible means 356 comprising a tape 357 with short cables 358 connected to its ends. The flexible means 356 extends through the various axial openings in the correction assembly 321 and the two brackets 291 and 292 and passes around a driving pulley 360 on one side of the device and around a pair of smaller pulleys 361 and 362 on the other side. The pulley 361 is illustrated in Fig. 11, as carried by a pair of bearings 363. For manual adjustment of the position of the slidable carriage 340 on the rotary frame a manually operable knob 364 on the side of the instrument case is connected with the pulley 361 by a shaft 365 and a pair of bevel gears 366.

The driving pulley 360 is keyed to a countershaft 367 that is mounted in two spaced bearings 368 (Fig. 5). Rotatably mounted on the countershaft 367 is a driven worm gear 370 and a toothed clutch collar 371 unitary therewith. A complementary toothed clutch collar 372 that is slidingly mounted on the countershaft 367 in engagement with a key 373 is controlled by a forked arm 375. As shown in Fig. 9 a rocker shaft 376 that carries the forked arm 375 terminates at one end in a bearing 377 and terminates at its other end in a clutch lever 378 on the side of the instrument case. To keep the two clutch collars normally engaged, a spring 379 (Fig. 9) may be placed in tension between a pin 379a on the clutch shaft 376 and the bracket 291. The worm gear 370 meshes with a worm 380 on a countershaft 381 that is mounted in a pair of spaced bearings 382, and a worm gear 383 keyed to the countershaft 381 meshes with the previously mentioned worm 48 on the drive shaft 47 from the motor 45.

At the normal initial disposition of the slidable carriage 340 for the beginning of a flight, the two friction wheels 297 and 298 are at or near the common axis of the two correction discs 275 and 276. Preferably a pair of helical springs 385 are mounted on the two rods 322 of the rotary frame to urge the slidable carriage 340 and the associated bell-cranks 342 and 343 toward the initial disposition shown in Fig. 9. As previously stated, the normal disposition of the correction assembly 321 places the two friction wheels out of contact with the associated correction discs 275 and 276 and out of contact with the two associated horizontal rollers 295 and 296. The described operating means deriving power from the motor 45 causes the slidable carriage 340 to move radially outward from the axis of the two correction discs 275 and 276 as the aircraft flies along the predetermined course.

Whenever the navigator identifies the instant position of the aircraft and discovers that the marker 27 is displaced from that position, he turns the knob 336 on the side of the instrument case to rotate the correction assembly 321 into effective disposition, thereby causing the two friction wheels 297 and 298 to interconnect their associated correction discs and horizontal rollers. Usually the required correction involves both adjustment of the map along the map axis M—M and lateral adjustment of the marker.

It will be noted that four separate variable transmissions are involved in correcting the triangle of velocities through adjustment of the marker and map, namely, a first adjustable transmission including the ball 56 and disc 53, a second adjustable transmission including the ball 81 and the disc 55, a third adjustable transmission including the friction wheel 297 and the correction disc 275, and a fourth adjustable transmission including the friction wheel 298 and the correction disc 276.

The described arrangement for causing relative movement between the map and the marker and for correcting the triangle of velocities is of course based on the required relationship between the map and the triangle. The scale of the map is taken into account in designing the triangle elements and in designing the operative connections between the triangle and the map. It is contemplated that all maps used will be of the same scale.

*Use of the device in navigation*

The method of operation will be readily understood from the foregoing description. Let the following facts be assumed prior to take-off for a cross-country flight: map axis 90° from north; true course 80°; wind 137° at 25 M. P. H.; true air speed at the contemplated altitude 100 M. P. H. In practice, of course, other data required will be magnetic variation for the locality and the magnetic deviation of the aircraft compass for different headings of the aircraft. For the purpose of simplifying the explanation, we choose to ignore these magnetic factors here and to derive the true heading to follow the true course rather than to derive the compass heading to follow a compass course.

Since the map axis is 90° from north, and since the triangle of velocities must be in some oriented relationship to the map axis, 90° is subtracted from 80° to arrive at the course in terms of the map axis and 90° is also subtracted from 137° to arrive at the wind direction in terms of the map axis. The relationships involved are indicated by Fig. 13. With the various eccentric locks in release positions, the navigator manipulates the knob 138 to place the azimuth ring 136 in a position with the 290° mark on the azimuth scale 139 opposite the reference line 149 representing the map axis. This adjustment disposes the radial slot 32 in the lower rotary table 33 at a position corresponding to 290° from the map axis M—M. Since the course is intended to be a constant quantity, at least for the first leg of a flight, the navigator locks the azimuth ring 136 at the set position by swinging the eccentric lock 145 downward.

To avoid confusion, the navigator preferably adjusts the disc 153 to give the wind direction scale 165 the same angular orientation as the azimuth scale 139 on the ring 136 before closing the eccentric lock 145. With the pivot assembly 31 unlocked, the navigator manipulates the knob 160 to place the pointer 163 at 47° on the scale 165 for the wind direction, then rotates the clamping disc 183 to place the pointer 186 at the 25 mile mark on the wind velocity scale 185 and swings the eccentric lock 181 downward to lock the pivot assembly 31 into one unitary structure. The flexible or articulated lock 190 that is connected at all times to the scale disc 153 of the pivot assembly serves when the pivot assembly is latched to maintain the wind vector arm 35 at the given azimuth and given length and yet permits the pivot assembly 31 to move with rotation of the upper rotary table 30 and to slide radially along the slot 28 in the upper rotary table.

To complete the adjustment of the triangle of velocities, the navigator rotates the clamping disc 118 to place the pointer 121 at the mark on the circular scale 122 representing 100 M. P. H. true air speed and swings the eccentric lock downward to maintain the air speed adjustment. This act locks the triangle. Rotation of the clamping disc 118 to shift the pointer 121 causes the pivot assembly 31 to shift along the radial slot 28 in the upper rotary table 30, and since the pivot assembly is connected with the locked radial slot 32 in the lower rotary table through the medium of the arm 35 and the stud 36, the translation of the pivot assembly toward the fixed vertex X causes the upper rotary table 30 to rotate automatically to a position representing the true heading of the aircraft relative to the map axis to be followed for the given course under the given wind conditions and at the given true air speed. The arrow 123 on the margin of the upper rotary table 30 stops at a point on the azimuth scale 139 that expresses the true heading in terms of the map axis. In the present example, the heading indicated on the scale 139 will be 67° 37' true or 277° 37' in terms of the map axis M—M, as indicated in Fig. 13. The transmission of the pivot assembly 31 along the slot 28 carries the stud 36 to a point on the radial slot 32 in the lower rotary table 33 that will represent the ground speed at which the aircraft will progress along the course under the given conditions. In the present case the navigator may note that the stud takes a final position opposite a point on the ground speed scale 34 representing 111.6 M. P. H. The probable duration of the flight may be computed from this figure. Magnetic corrections may be added to or subtracted from the true heading 67° 37' to find the required compass heading. The pilot is guided by the heading derived in the above described manner from the triangle of velocities.

With a line 390 (Fig. 1) marked on the map 25 to represent the desired course, the navigator manipulates the knobs 76 and 317 to position the marker 27 at the beginning of the course, and as soon as the aircraft takes off on the course the navigator turns on the motor 45 to set the mechanism in operation. The correction assembly 321 is, of course, in its ineffective position, and at the start of the flight the slidable carriage 340 is at a starting position with the two friction wheels 297 and 298 at the axis of the two correction discs 275 and 276. During flight the navigator watches the air speed indicator and revises the true air speed vector of the device from time to time as required, correcting the instrument-indicated air speed to true air speed. The navigator may also use a suitable ground sight to check the drift angle for comparison with the setting of the mechanical triangle and may find opportunities to compute the ground speed by terrestrial observation for checking the setting of the stud 36 along the ground speed scale 34. Whenever possible the navigator obtains a fix and checks the position of the marker 27 relative to the map 25 with the actual position of the aircraft.

If a Mercator map is used, all the meridians will be shown as parallel lines and a straight line on the map will be a rhumb line cutting the various meridians at the same angle and representing a constant compass course. Unless such a rhumb line lies precisely east and west, mileage cannot be measured along the line by a uniform unit because of the distortion created by showing the meridians parallel. With a correctly adjusted triangle of velocities, the marker 27 will follow with close accuracy a straight line on a Mercator map representing a compass course and any departure of the marker from the straight line will reliably indicate either error in the original setting of the triangle or a change in wind in the course of flight, provided of course the indicated heading has been maintained, and provided the air speed adjustment is correct. Because of distortion in the length of the rhumb line on a Mercator map, however, the marker will tend either to gain or to lag relative to the true position of the aircraft along the course represented by the rhumb line, and such a gain or lag must be taken into consideration whenever the marker position is compared with the true position of the aircraft.

The Lambert conformal conic projection, which is employed for aeronautical maps in the United States, has converging meridians and a straight line on a Lambert map is not a rhumb line or compass course but a great circular course. The compass bearing varies progressively along such a course unless the course lies precisely north and south or precisely east and west. In practice a course is laid out as a straight line on a Lambert map and the course is flown by the average bearing, i. e., the compass bearing at the mid-point of the straight line. If a long flight is contemplated, the flight is divided into short courses not more than 3°–4° longitude. During such a flight the track of the aircraft over the terrain will depart from the map course at the beginning and return at the end, i. e., the track will bow outward or curve away from the straight line on the map to a maximum departure at the mid-point of the straight line and then return at the end of the straight line.

Since there is no distortion in length of a course shown on a Lambert map, the marker of the present device will accurately measure on a Lambert map the actual distance flown, provided, of course, the setting of the device is correct, but the aircraft will depart slightly from the track, as described above, if the course is flown by the average bearing of the course. If the aircraft is flown by the average magnetic variation of the course, a second factor will cause similar variation of the track from the map course. Whenever a fix is obtained in the course of flight, the navigator will have in mind the departure of the track from the true course. The departure may be slight enough to be ignored or may be roughly estimated for consideration in comparing the position of the marker to the true position of the aircraft. If precision is required the departure may be calculated beforehand and the track may be shown as a dotted line 391 (Fig. 1) alongside the full line representing the map course. If the fix reveals that the aircraft is at a position on the dotted line 391 opposite the position of the marker 27 on the full line 390, no correction of the triangle of velocities is required.

If the fix obtained by the navigator reveals that the aircraft is off the course, the simple manipulations necessary to shift the marker and map to correspond with the true position of the aircraft may be employed to correct or assist in correcting the setting of the triangle of velocities. The navigator unlocks the pivot assembly 31, thereby releasing the wind vector of the triangle for change in magnitude and direction and thereby simultaneously releasing the heading vector for change in direction. The friction disc 137 is also unlocked to permit the stud 36 to shift in any direction in the plane of the lower rotary table 33. The knob 336 is rotated to shift the correction assembly 321 to effective position, thereby placing the two friction wheels 297 and 298 against the corresponding correction discs 275 and 276 at a correction-factor distance from the axis of the two correction discs. The navigator then manipulates the knobs 76 and 317 to correct the position of the marker relative to the map and such manipulation results in revision of the triangle of velocities in the manner heretofore described.

After the marker is maneuvered to the corrected position, the navigator turns the knob 336 to restore the correction assembly 321 to its normal ineffective position and then restores the slidable carriage 340 of the correction assembly to its starting position at the axis of the two correction discs. To restore the carriage to the starting position, the operator turns the lever 378 to disengage the clutch collar 371 and then rotates the knob 364 to actuate the flexible means thereby to shift the carriage. The springs 385 acting against the carriage tend to shift the carriage to the starting position and may be strong enough to cause the carriage to return to its initial position automatically whenever the clutch lever 378 is tripped.

When the triangle of velocities is unlocked, as described above, for the purpose of causing manipulation of the marker and map to correct the triangle, usually two factors are permitted to remain mechanically fixed in the adjustment of the triangle, namely, the direction of the course and the true air speed. Four factors remain variable, namely, the ground speed, heading, wind direction, and wind velocity. The adjustment of the marker and map moves the stud 36 representing the vertex Y to a new position in a positive manner and thereby determines a new value for the ground speed on the scale 34. Since the heading of the aircraft maintained over the traversed course is known, i. e., since the heading factor in the original setting of the triangle is not questioned, the navigator may now manipulate the upper rotary table as necessary to put the heading index 123 at the original point on the azimuth scale 139. With this act four values are fixed in the triangle of velocities: course, ground speed, heading, and true air speed. Since any four values fix the triangle, the revised values of wind direction and wind velocity are automatically derived and all the locking members of the triangle may now be closed. If the departure from the course has been substantial at the point of correction, the navigator may change the triangle accordingly before closing the locks, the newly derived wind values being retained.

The described triangle of velocities is conveniently flexible in the sense of being adapted to perform various navigation computations. The triangle of velocities represents six factors, three direction values and three magnitude values, and any four of these values will determine the triangle and thereby determine the other two values. At the start of the flight the known values are the course, true air speed, wind direction, and wind velocity, the unknown values being heading and ground speed. The flexibility of the mechanical triangle in computations may be illustrated by referring to a procedure for ascertaining local wind direction and velocity during flight.

To ascertain the local wind values during flight at the flight elevation, the navigator may employ the double drift method set forth in Practical U. S. Department of Commerce, page 169. The plane is flown on a detour of two legs, the first leg being away from the course at 45° and the second leg being 90° from the first leg and being back to the course at 45°. Both legs are flown at equal distance to restore the aircraft to the course. Drift angle observations are made on both legs of the detour and are applied to a graph in the above publication to derive the required heading for following the desired course and to derive the ground speed in the terms of per cent of the true air speed. The known values made available in this manner for manipulating the triangle of velocities are the course, the true air speed, the heading, and the ground speed. When the mechanical triangle is adjusted to these four known values, the wind direction and wind velocity prevailing at the locality and flight elevation are automatically derived. The double drift method may be employed over water by using suitable flares.

After a detour for a double drift computation, the motor 45 of the device should be stopped for a sufficient interval of time to compensate for the excess mileage traversed on the detour. The two legs of the detours are sides of a square and the course lies along the diagonal of the square. Since the length of a diagonal is 71% of the length of two sides of a square, the operator may measure the elapsed time of the detour with a stop watch and then deenergize the motor 45 for an interval representing 29% of the elapsed time on the detour.

More than one map and corresponding marker may be controlled by a single mechanical triangle of velocities. The second map and cooperating marker may be placed in some convenient position for observation by the pilot, or in passenger service may be placed in a position for ready reference by the passengers.

The disclosure herein in specific detail of one embodiment of our invention will suggest to those skilled in the art various modifications and substitutions within the scope of the underlying concept; we reserve the right to all such departures from the present disclosure that are defined by the following claims.

We claim as our invention:

1. A navigation device for aircraft having in combination: a map; a marker means; actuating means to cause relative movement between said map means and marker means to cause the marker means to follow a path across the map; a vector means comprising an arm adjustable in length to represent the ground speed of the aircraft along a selected course over terrain represented by the map; means for pivoting said arm about a fixed axis to represent the direction of said selected course; and means responsive to the length and direction of said vector means to control relative movement between said map and marker means to cause the marker means to approximate instant positions of the aircraft on said map.

2. A navigation device for aircraft having in combination: a map; a marker, said map and marker being adapted for relative movement; an adjustable mechanical triangle of velocities having legs representing vectors for ground speed, true air speed, and wind velocity; means for pivoting said ground speed and said air speed legs about a fixed axis; means to cause relative movement between said marker and map corresponding to a first component of the ground speed vector of said triangle; and means to cause relative movement between said marker and map corresponding to a second component of the ground speed vector of said triangle.

3. A navigation device for aircraft having in combination: a map; a marker, said marker and map being adapted for relative movement to permit the marker to follow various paths across the map; adjustable means to represent the direction and disposition of a true air speed vector; adjustable means to represent the magnitude and direction of a wind velocity vector; adjustable means to represent the magnitude and direction of a ground speed vector, said three adjustable means being operatively interrelated to form a mechanical diagrammatic triangle of velocities for prevailing flight conditions; and means responsive to the adjustment and disposition of said triangle of velocities to cause said marker to follow a given course on said map substantially synchronously with the flight of the aircraft along said course.

4. A navigation device for aircraft having in combination: adjustable means to represent the direction of a ground speed vector without determining the magnitude of the vector; adjustable means comprising a pivoted arm of adjustable length, the length of this arm being adjustable to represent the magnitude of a true air speed vector without determining the direction of the true air speed vector as represented by the angular disposition of said arm; adjustable means comprising another pivoted arm adjustable in disposition and length to represent respectively the direction and magnitude of a wind velocity vector, said arms of said adjustable means being operatively connected to determine automatically the magnitude of the ground speed vector and the direction of the true air speed vector; a map; and means responsive to said first adjustable means to indicate the approximate instant position of the aircraft on said map throughout a flight along a course corresponding to said ground speed vector.

5. A navigation device for aircraft having in combination: an adjustable mechanical triangle of velocities providing two arms pivoted relative to each other on an axis representing a fixed vertex, said two arms respectively representing ground speed and air speed vectors, and a third arm representing a wind velocity vector, said third arm being pivoted to said two arms on two axes spaced from each other and from said first-named axis, said two spaced axes representing two movable vertices; a control member movable with one of said movable vertices of the mechanical triangle to represent the ground speed vector of the triangle; a first movable means operatively connected to said control member to represent a component of the ground speed vector; a second movable means operatively connected to said control means to represent a second component of said ground speed vector; a map; a marker, said map and marker being adapted for relative movement; means including a first variable transmission to cause relative movement between said marker and map in one direction, said first variable transmission being responsive in adjustment to changes in position of said first movable means; and means including a second variable transmission to cause relative movement between said marker and map in a second direction, said second variable transmission being responsive in adjustment to changes in position of said second movable means.

6. A navigation device for aircraft having in combination: a first movable means adjustable in dimension to represent a ground speed vector; a second movable means adjustable in dimension to represent a wind velocity vector; a third movable means adjustable in dimension to represent a true air speed vector, said three means being operatively interconnected to form a triangle of velocities; means to hold one of said first two movable means in selected positions of direction independently of changes in direction and dimension of the other movable means whereby the dimension of said first movable means representing the magnitude of the ground speed vector may be set automatically for given flight conditions by setting the second and third movable means in accord with the flight conditions; a map; a marker, said map and marker being adapted for relative movement; and means to cause relative movement between said marker and map, said last means being responsive to changes in the directional position and the dimension adjustment of said first movable means.

7. A navigation device for aircraft having in combination: a first movable means adjustable in dimension to represent a ground speed vector; a second movable means adjustable in dimension to represent a wind velocity vector; a third movable means adjustable in dimension to represent a true air speed vector, said three means being operatively interconnected to form a triangle of velocities; an anchored flexible means connected with one of said first two movable means to maintain directional position thereof independently of movements and adjustments of the other movable means whereby the dimension of said first movable means representing the magnitude of the ground speed vector may be set automatically for given flight conditions by setting the second and third movable means in accord with the flight conditions; a map; a marker, said map and marker being adapted for relative movement; and means to cause relative movement between said marker and map, said last means being responsive to changes in the directional position and the dimension adjustment of said first movable means.

8. A navigation device for aircraft having in combination: a map; a marker, said map and marker being adapted for relative movement; an adjustable mechanical triangle of velocities having legs representing vectors for ground speed, true air speed, and wind velocity; an azimuth means for orienting said triangle of velocities relative to the map; means to cause relative movement between said marker and map corresponding to a first component of the ground speed vector of said triangle; and means to cause relative movement between said marker and map corresponding to a second component of the ground speed vector of said triangle.

9. A navigation device for aircraft having in combination: a map; a marker, said map and marker being adapted for relative movement; an adjustable mechanical triangle of velocities having legs representing vectors for ground speed, true air speed, and wind velocity; means to cause relative movement between said marker and map; adjustable transmission means included in said means for causing relative movement, said transmission means being responsive in adjustment to changes in the directional position and length of the ground speed side of said triangle; a mechanism to change the adjustment of said triangle of velocities automatically in response to corrective relative movement between said marker and map; an adjustable transmission included in said mechanism to control the degree of responsiveness of the triangle of velocities to such corrective relative movement between the marker and map; and means to progressively change the adjustment of the latter transmission in the course of flight to reduce the magnitude of adjustment of the triangle of velocities in response to corrective relative movement between the marker and the map.

10. A navigation device for aircraft having in combination: an adjustable triangle of velocities providing a fixed vertex and two movable vertices; a control member movable with one of said movable vertices to represent changes in direction and magnitude of the ground speed vector in said triangle of velocities; a first component means operatively connected with said control member to automatically shift in response to changes in one component of said ground speed vector; a second component means operatively connected to said control means to automatically shift in response to changes in a second component of the ground speed vector; a map; a marker, said map and marker being adapted for relative movement; means including a first adjustable transmission to cause relative movement between said marker and map in a first direction, said first transmission being responsive in adjustment to movements of said first component means; means including a second adjustable transmission to cause relative movement between said marker and map in a second direction, said second transmission being responsive in adjustment to movements of said second component means; means including a third adjustable transmission to move said first component means and thereby said control member in response to corrective relative movement between said marker and map in said first direction; means including a fourth adjustable transmission to move said second component means and thereby said control member in response to corrective relative movement between said marker and map in said second direction; and means to progressively change the adjustment of said third and fourth transmission means automatically in the course of flight to progressively reduce the magnitude of movement of said control member in response to corrective relative movement between said marker and map.

11. A navigation device for aircraft having in combination: a map; a marker, said map and marker being adapted for relative movement; an adjustable mechanical triangle of velocities having legs representing vectors for ground speed, true air speed, and wind velocity; means to cause relative movement between said marker and map corresponding to a first component of the ground speed vector of said triangle; means to cause relative movement between said marker and map corresponding to a second component of the ground speed vector of said triangle; means responsive to corrective relative movement between said marker and map to automatically correct the adjustment of said triangle of velocities when the position of the marker relative to the map is manually corrected; and means effective in the course of flight to progressively reduce the magnitude of adjustment of said triangle in response to said corrective relative movement.

12. A navigation device for aircraft having in combination: a first vector means rotatable about a fixed vertex point to establish a first line radial means and adjustable along said line to define with said vertex point a first velocity vector; a second vector means rotatable about said fixed vertex point to establish a second line radial thereto; means included in said second vector means and adjustable along said second line to define with said fixed vertex point a second velocity vector; a third vector means adjustably interconnecting said two movable means to represent a third velocity vector, said three vector means forming a triangle of velocities, one of said vector means representing ground speed and the ground course of the aircraft; means to maintain at least one of said three vector means in fixed direction independently of changes of the other of the three vector means whereby the triangle of velocities may be adjusted without disturbing the direction of the fixed vector means; a map; a marker; and means responsive to the length and direction of said ground speed and ground course vector to cause said marker to approximate the instant positions of the aircraft on said map.

13. A navigation device for aircraft having in combination: a first vector means rotatable about a fixed vertex point to establish a first line radial thereto; means included in said first vector means and adjustable along said line to define with said vertex point a first velocity vector; a second vector means rotatable about said fixed vertex point to establish a second line radial thereto; means included in said second vector means and adjustable along said second line to define with said fixed vertex point a second velocity vector; a third vector means adjustably interconnecting said two movable means to represent a third velocity vector, said three vector means forming a triangle of velocities, one of said vector means representing ground speed and the ground course of the aircraft; means to maintain at least one of said three vector means in fixed direction independently of changes of the other of the three vector means whereby the triangle of velocities may be adjusted without disturbing the direction of the fixed vector means; a map; a marker; means responsive to the length and direction of said ground speed and ground course vector to cause said marker to approximate the instant positions of the aircraft on said map; means responsive to corrective relative movement between said marker and map to automatically correct the adjustment of said triangle of velocities when the position of the marker relative to the map is manually corrected; and means effective in the course of flight to progressively reduce the magnitude of adjustment of said triangle in response to said corrective relative movement.

14. A navigation device for aircraft having in combination: a first vector means rotatable about a fixed vertex point to establish a first line radial thereto; a first means included in said first vector means and adjustable along said line to define with said vertex point a first velocity vector; a second vector means rotatable about said fixed vertex point to establish a second line radial thereto; a second means included in said second vector means and adjustable along said second line to define with said fixed vertex point a second velocity vector; a third vector means adjustably interconnecting said first and second means to represent a third velocity vector, thereby defining a triangle of velocities; a map; a marker, said marker and map being adapted for relative movement to permit the marker to follow various paths across the map; actuating means to cause relative movement between said marker and map; control means responsive to one component of movement of said first means to regulate one component of relative movement between said marker and said map; and a second control means responsive to a second component of movement of said first means to regulate a second component of relative movement between said marker and said map.

15. A navigation device for aircraft having in combination: a first vector means rotatable about a fixed vertex point to establish a first line radial thereto; a first means included in said first vector means and adjustable along said line to define with said vertex point a first velocity vector; a second vector means rotatable about said fixed vertex point to establish a second line radial thereto; a second means included in said second vector means and adjustable along said second line to define with said fixed vertex point a second velocity vector; a third vector means adjustably interconnecting said first and second means to represent a third velocity vector, thereby defining a triangle of velocities; a map; a marker, said marker and map being adapted for relative movement to permit the marker to follow various paths across the map; actuating means to cause relative movement between said marker and map; control means responsive to one component of movement of said first means to regulate one component of relative movement between said marker and said map; a second control means responsive to a second component of movement of said first means to regulate a second component of relative movement between said marker and said map; means to maintain said third vector means in a given direction while permitting translation thereof to a range of positions in the course of adjustment of said triangle; and means to releasably connect said third vector means with said direction-maintaining means.

16. In a navigation device for aiding in the navigation of a body moving relative to the earth's surface, the combination of: a map; a marker; automatic means for effecting relative movement between said marker and map to cause said marker to follow approximately a chosen course on said map as said body moves relative to the earth's surface, said marker and said map being relatively movable manually for corrective relative movement therebetween to bring said marker opposite a known point on said chosen course; corrective means responsive to the amount of such corrective relative movement for modifying said automatic means to correct the relative motion of said marker and map effected by said automatic means after such corrective relative movement; and means associated with said corrective means and responsive to the distance traveled by said body since a previous corrective relative movement for reducing the magnitude of the correction on said automatic means effected by a given corrective relative movement of said marker and map, such magnitude of correction decreasing as the distance traveled increases.

17. A combination as defined in claim 14, including means for maintaining two of said vector means in fixed directions independently of changes of direction of the other of the three vector means whereby said two directionally-fixed vector means may be adjustable to automatically fix the adjustment of the other of the three vector means.

18. A combination as defined in claim 14, including means for maintaining said third velocity vector means in a selected orientation during changes of positions thereof incidental to adjustment manipulation of said triangle of velocities.

19. A combination as defined in claim 14, including an azimuth scale to indicate the direction in which one of said vector means is disposed, and including a second azimuth scale to indicate the direction in which another of said vector means is disposed, said second scale being mounted on one of said vector means to move therewith, and including means anchored apart from said vector means to maintain a selected orientation of said second scale during changes of position of said second scale incidental to adjustment manipulation of said triangle of velocities.

20. A combination as defined in claim 14, including means for maintaining two of said vector means in fixed directions independent of directional changes of the other of the three vector means whereby said two directionally-fixed vector means may be adjusted to fix the adjustment of the other of the three vector means, an azimuth scale for indicating the direction in which one of said vector means is disposed, said azimuth scale being mounted on said triangle of velocities for movement with changes in adjustment of the triangle, and parallel-motion means for maintaining said azimuth scale in a selected orientation.

21. A combination as defined in claim 14, in which said first vector means and said first means define an air speed vector, and in which said second vector means and said second means define a ground speed vector, and in which said third vector means defines a wind velocity vector, and including means for maintaining said third vector means in fixed direction independently of changes in said air speed vector and said ground speed vector whereby said triangle of velocities may be adjusted without disturbing the direction of said wind velocity vector.

HOWARD R. HUGHES.
STANLEY A. BELL.